Oct. 12, 1971  O. MESKANEN ET AL  3,611,471

SCRAPER DEVICE

Filed June 19, 1968  2 Sheets-Sheet 1

OLAVI MESKANEN and ERKKI LIKOLA
INVENTORS

By: Richards & Geier
ATTORNEYS

Oct. 12, 1971   O. MESKANEN ET AL   3,611,471
SCRAPER DEVICE

Filed June 19, 1968   2 Sheets-Sheet 2

OLAVI MESKANEN and ERKKI LIKOLA
   INVENTORS
By: Richard & Gein
   ATTORNEYS

United States Patent Office 3,611,471
Patented Oct. 12, 1971

3,611,471
SCRAPER DEVICE
Olavi Meskanen, Vekarokatu, and Erkki Likola, Minna Canthinkatu, Finland, assignors to Valmet Oy, Helsinki, Finland
Filed June 19, 1968, Ser. No. 738,180
Int. Cl. D21g 3/02
U.S. Cl. 15—256.51  2 Claims

ABSTRACT OF THE DISCLOSURE

A scraper device intended for use in paper machines and the like has turning cylinders at its ends for producing the required blade pressure against the roll. The body of the device includes a box-type beam to which a blade is fixed. Inside this beam there is another separate inner beam. Flexible loading tubes are located in spaces provided between the sides of the two beams. Variable pressures can be supplied to the tubes.

---

The present invention concerns a scraper device especially intended for a paper machine but also suitable for use on other equivalent machines. Many of the rolls in a paper machine have to be provided with an external scraper device which prevents the pulp or the completed paper from sticking to the surface of the roll. In paper machines, scrapers are used e.g. in calenders and presses. The scraper device has usually consisted of a comparatively rigid body and an elastic, and most often exchangeable, blade attached to it, which rubs against the surface of the roll. The requisite blade pressure between the blade and the roll was previously produced by the proper weight of the scraper device. In this instance the blade pressure is nearly constant over the entire length of the roll, which is indeed one of the advantages of a scraper of this kind. However, it is a drawback that higher blade pressures are difficult to achieve. In order to accomplish the required blade pressure one has begun to use scraper devices which have hydraulically or pneumatically operated turning cylinders at their ends. The blade pressure can thus easily be made high enough, but in this case the blade pressure will be smaller in the middle than at the ends, with the resulting detriment that the blade does not scrape in the middle, most often with the consequence of service trouble.

An object of the present invention is to eliminate these drawbacks. Since the body of a scraper device according to the invention consists of a box-type body beam in which is enclosed another inner beam separate from it, facilities existing for generation of a pressure between the beams by means of a flexible loading tube or equivalent, the blade can be rendered such by adjusting the pressure of the loading tube, that it conforms to the surface of the roll. It is advantageous if also the inner beam is a beam of box-type construction. On the inner sides of the body beam there may be loading strips which together with the sides of the inner beam and the side flange attached to these form channels in which the loading tubes or equivalent are located.

The invention is described in greater detail in the following with reference to the embodiment presented in the attached drawings.

Figure 1:
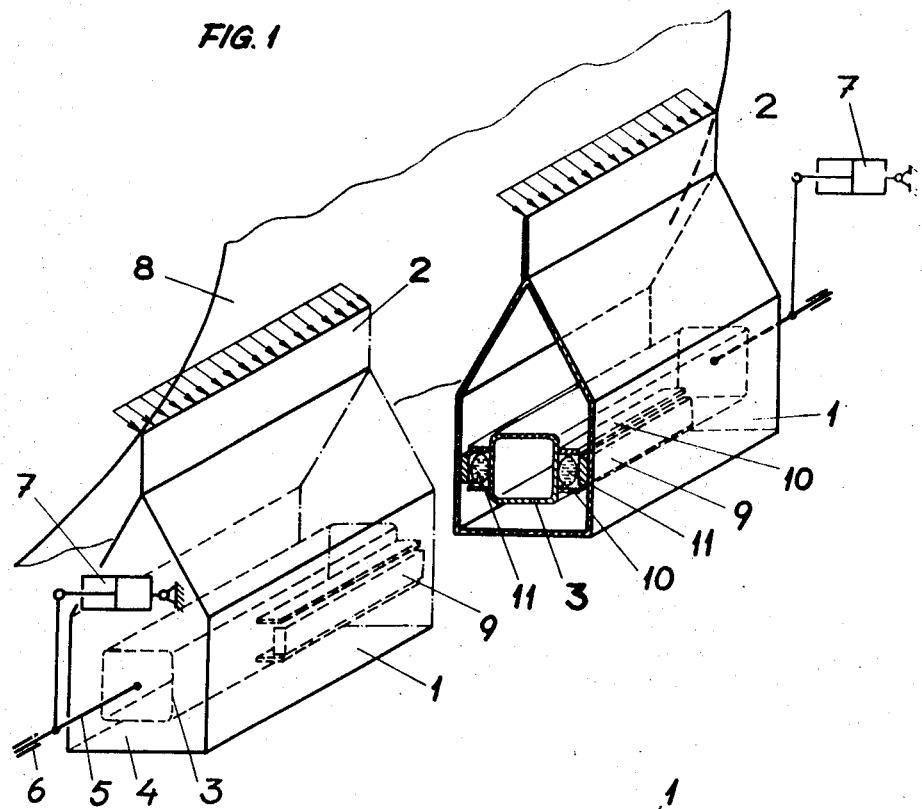
Figure 2:
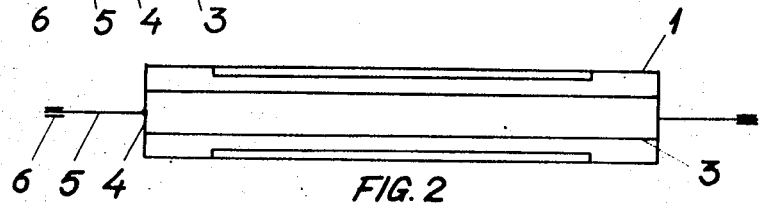
Figure 3:
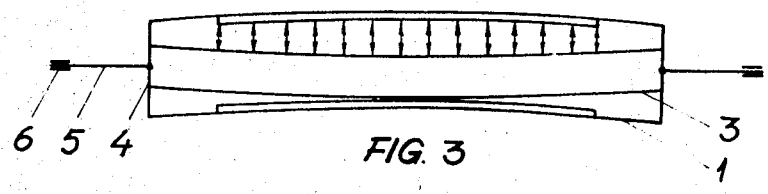
Figure 4:
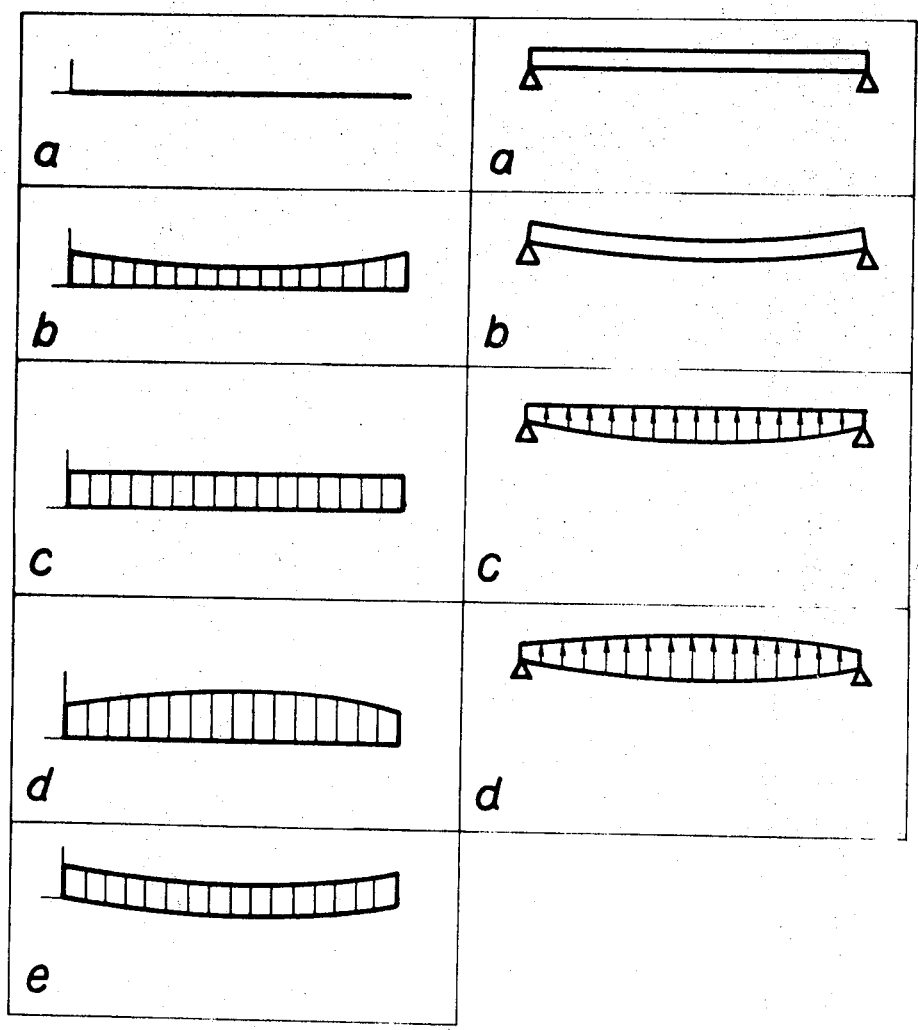

In the drawing, FIG. 1 shows a scraper device according to the invention, in axonometric presentation. FIG. 2 shows, schematically, the scraper device in section in the case that there is no pressure in the loading tubes comprised in the device. FIG. 3 shows, correspondingly, the scraper device when there is pressure in one of the two loading tubes. In FIG. 4 the blade pressure distribution is shown which is caused by different modes of loading.

The body of the scraper device consists of a body beam 1 in box construction, to which the scraper blade 2 has been fixed. Inside the said body beam there is a box-type inner beam 3, which is fixed at its end to the end pieces 4 of the body beam. The said end pieces carry the axle pins 5, which are journalled in bearings 6 so that the scraper device is able to turn. The said axle pins are connected to turning cylinders 7 at the ends of the scraper device in previously known manner, so that the blade 2 can be made to press with desired blade pressure against the roll 8.

The inner sides of the body beam 1 carry loading strips 9, which together with the sides of the inner beam 3 and the side flanges 10 attached to these form channels between the sides of the body beam and of the inner beam. In these channels the loading tubes 11 have been placed, in which a pressure of desired magnitude can be produced by means of some device (not shown) belonging in itself to prior art. When there is no pressure in the loading tubes, the body beam 1 and the inner beam 3 are both straight, as has been shown in FIG. 2. FIG. 3 illustrates the condition of the scraper device when pressure has been generated in one of the two loading tubes. If pressure is applied to the other loading tube, the body beam will assume a curvature opposite in direction to that in FIG. 3.

FIG. 4 is a schematic presentation of the kind of blade pressure distribution caused by different modes of loading. Each partial figure on the left represents the blade pressure and that on the right of it, the loading of the beam.

In the partial figure a, the beam is under no load. The blade pressure is nil, as can be seen from the left partial figure a. In the right-hand partial figure b a beam has been shown which has been loaded by means of the turning cylinders. In this case the blade pressure is of the type shown in the left partial figure b. It is to be noted that the blade pressure is then lowest at the centre of the blade. In the right-hand partial figure c, the beam has been loaded by means of the turning cylinders and the blade pressure has been equalized by using a scraper device according to the invention, by applying a pressure of given magnitude to one side. It is seen from the left partial figure c that the blade pressure is uniform. In the right-hand partial figure d, a higher pressure than in partial figure c has been caused in one of the two tubes of the scraper device. In this instance the blade pressure is shown by the left partial figure d, and it is higher in the centre than at the ends of the blade. Partial figure e illustrates the blade pressure when a scraper device according to the invention has been adjusted to fit against a convex (bulged) roll.

By means of a scraper device according to the invention it is possible, as is evident from the foregoing, to achieve uniform blade pressure against the roll or to make the pressure in the centre higher (or lower) than at the ends.

The invention is by no means restricted to the embodiment presented in the foregoing; it may rather be modified in a number of ways while still remaining within the scope of the invention. For instance, it is not mandatory that there is a flexible loading tube on either side between the body beam of the scraper device and the inner beam inside it, because one single loading tube is sufficient in many instances. In the spaces between the body beam and the inner beam there may also be two or several loading tubes in each space. The loading of the tube may be accomplished by means of a hydraulic or pneumatic device. The tube may also be replaced with loading cylinders.

We claim:
1. A scraper device for use in paper machines and the like, comprising a box type main beam having flat walls and adapted to carry a blade, a separate inner beam also having flat walls and located within said main beam, spaces being provided between parallel walls of the two beams, spaced side flanges extending in pairs on opposed sides of the plane of said blade and between said parallel walls, two separate means located, respectively, between each said pair of side flanges for producing different adjustable pressures, and power cylinders turning the scraper device to urge the blade with desired force against a roll.

2. A scraper device in accordance with claim 1, wherein each said means consists of an inflatable loading tube of resilient material located in said space between its respective pair of side flanges and adapted to receive pressures of different magnitudes.

References Cited

UNITED STATES PATENTS

| 3,327,341 | 6/1967 | Kuehn | 15—256.51 |
| 3,399,420 | 9/1968 | Crist | 15—256.51 |

LEON G. MACHLIN, Primary Examiner

U.S. Cl. X.R.

100—174